(12) United States Patent
Chien (10) Patent No.: US 7,832,918 B2
(45) Date of Patent: *Nov. 16, 2010

(54) LED NIGHT LIGHT HAS LASER OR HOLOGRAM ELEMENT(S)

(76) Inventor: Tseng-Lu Chien, #503 Dotta La., Walnut, CA (US) 91789

( * ) Notice: Subject to any disclaimer, the term of this patent is extended or adjusted under 35 U.S.C. 154(b) by 0 days.

This patent is subject to a terminal disclaimer.

(21) Appl. No.: 12/318,473

(22) Filed: Dec. 30, 2008

(65) Prior Publication Data

US 2009/0175033 A1   Jul. 9, 2009

(51) Int. Cl.
*H01R 33/00* (2006.01)
(52) U.S. Cl. ............ 362/641; 362/249.02; 362/644
(58) Field of Classification Search ............. 362/641, 362/642, 643, 249.02–249.06; 359/15, 13, 359/22, 32
See application file for complete search history.

(56) References Cited

U.S. PATENT DOCUMENTS 6,072,606 A * 6/2000 Huether et al. ............... 359/15
6,736,530 B2 * 5/2004 Thevenot .................... 362/362

* cited by examiner

*Primary Examiner*—Gunyoung T Lee
(74) *Attorney, Agent, or Firm*—Bacon & Thomas, PLLC

(57) ABSTRACT

An LED night light has a laser or hologram optics-element and is suitable for night time or dark area use over an extended time period. The night light may be a plug-in wall outlet night light or direct current(DC) operated night light having an image, message, or logo shown on the surface of the optics element. The LED night light parts that may include a housing member, optics-lens, openings, cut-outs, and/or plastic parts to create a preferred image. The night light can be designed with added features to enable adjustment of the angle, distance, position, or orientation of the LED(s) with respect to the optics-means to provide eye-catching light effects by varying the image size, dimensions, etc. The power source may be interchanged between an AC powered sealed-unit and a DC powered battery-pack.

10 Claims, 11 Drawing Sheets

LED NIGHT LIGHT HAS LASER OR HOLOGRAM ELEMENT(S)

BACKGROUND OF THE INVENTION

This invention is related to or has subject matter in common with U.S. patent application Ser. Nos. 12/292,153 ("LED night light has projection or image feature"); 12/318,470 ("LED Projection Night Light"); 12/("Removable LED light device"); 12/073,889 ("LED track light device"); 12/073,095 ("LED light with changeable position with Prefereable power source"); 12/007,076 ("LED light with changeable geometric system"); 12/003,691 ("LED light with changeable geometric dimension features"); 12/003,809 ("LED light with changeable features"); 11/806,711 ("Multiple LED light with adjustable angle features"); 11/527,631 ("LED Night light with interchangeable display unit"); 11/498,881 ("Poly Night light"); 11/255,981 ("Multiple light source Night Light"); 11/094,215 ("LED Night light with Liquid optics medium"); 11/092,741 ("Night light with fiber optics"); 10/883,747 ("Fiber Optic light kits for footwear") 11/498,874 ("Area Illumination for LED night light"); 11/527,629 ("Time Piece with LED night light"); 11/527,628 ("Multiple Function Night light with Air Freshener"); 11/806,284 ("LED Night light with more than one optics mediums"); 11/806,285 ("LED Night Light with multiple function"); and 11/806,711 ("Multiple LEDs Light with adjustable angle function"); The current invention uses laser or hologram optics means in front of a light source to create splendid light effects shown on the surface of the laser or hologram optics means to provide the night light with eye-catching effects and offer illumination in a dark environment.

The laser or hologram optics means of the current invention may be produced by an injection, stamping, embossing, or pressure rolling procedure. The injection procedure may be the same as the one described in the Inventor's U.S. Pat. No. 5,667,736, issued on Sep. 16, 1997. The stamping procedure uses laser optics tooling to stamp a PET or other plastic sheet to provide the plastic sheet with a laser or hologram function. The embossing and pressure rolling procedures put the laser or hologram optics tooling on a roller with a certain pressure to provide the plastic or any other desired material with the laser or hologram function, so can make the hologram can be made very cheap.

The current invention incorporates the above-described laser or hologram optics means in a night light which may be a plug-in night light from an AC adaptor, a night light powered by batteries, or a night light powered by an AC power source with a plug and wires supplying electricity from a wall outlet for use as dark environment illumination to recognize the position of other items. The night light may be installed and used over a long time period, for example more than a quarter year (three months is a minimum quality guarantee for night light production). This is different than a laser or hologram toy, seasonal lighting, Christmas light, or Halloween light device, which is only used for a few days by most people. There is a big difference in the marketplace between everyday light and seasonal lighting categories.

The current invention also uses different locations to apply the laser or hologram means to get different sizes of an image to fit into certain surface dimensions and provide a more attractive light performance. This is not the case with seasonal lighting.

The current invention also provides an alternative way to allow people to adjust the light source position, orientation, or height with respect to laser or hologram optics means.

Still further, the current invention provides techniques to apply solve a light source(s) narrow viewing angle by using laser or hologram optics means. The center line of an LED light beam will provide the biggest image and, away from this viewing angle, the image will become smaller. This property can be used to make the light performance more artistic.

According to the current invention, the night light can be incorporated in another plastic housing to make a finished product or a laser or hologram sheet can be used to form a tube, cone, box, case, or other geometric shape without any other housing to provide a finished product (in which the light source has its own construction to meet the safety standard).

The current invention may include a "sealed-unit" of the type disclosed in the Inventor' copending application Ser. No. 11/527,631, which contains all electric components including a prong, circuit, trigger means, and/or an LED or LED connector to supply power from an AC power source to turn on and turn off the LEDs. The "sealed-unit" also can be replaced by a battery-pack which contains all electric components including batteries, a circuit, trigger means, and/or an LED or LED connectors to cause illumination of the night light according to a pre-determined function, timing, duration, and/or effects. This provides the night light with a changeable "power source," from AC to DC or DC to AC.

Finally, the current invention also may involve a plastic sheet with laser or hologram optics means applied on a surface and arranged to allow air to get in and out in order to achieve desired geometric shape with a channel to allow the light means to be inserted into, within, or on a desired location to provide a balloon with attractive light effects for illumination for dark environment for kids.

BRIEF DESCRIPTION OF DRAWINGS

FIGS. 2 and 3 show a different viewing angle of the current invention's image projection on a surface of the optics means of a preferred embodiment of a puck light or tap light with a variety of different of colors, sizes, shapes, and/or designs on its surface. It also can have some art applied on a surface to improve the punk light when the LED is not turned on.

FIGS. 4, 6, 7-1, and 7-10 illustrate the construction of an LED, laser or hologram optics means, and a viewing surface, as well as variations in the relationship between the LED(s) light source and optics means to get different light performance, and methods to achieve an adjustable light means.

DETAILED DESCRIPTION OF THE PREFERRED EMBODIMENTS

The LED night light having a laser or hologram optics-means of the current invention is different from a conventional toy, seasonal lighting, Christmas lighting, or Halloween lighting, which is only designed to be used for one or several days.

The current invention concerns night light applications with LED or LEDs as a light source to directly plug into an outlet device, so the circuit needs to be specially designed to utilize AC 110V 60 Hz input power to drive the LED or LEDs.

The current invention may also, however, include a direct current (DC) operated night light in which the LED or LEDs are turned on by pushing or touching a housing-member. This is same as a conventional puck or tap light in the way the LED or LEDs are driven to turn on. The night light of the invention also can be designed in a manner similar to a conventional touch light, such that the light source will turn on whenever the housing-member has been touched by a person's skin. All such touch lights have a housing-member pre-connected with inner circuit means to provide a turn on and turn off light source function. The current invention preferably uses this kind of push or touch housing-member to activate the circuit to turn on and turn off the LED light source because such an LED night light has a higher value than one operated by a switch on the surface of the DC operated night light.

The current invention offers big improvements by adding optics-means to an AC or DC operated night light to increase the eye-catching light effects.

The LED night light of the current invention includes not only laser or hologram optics-means, but also additional parts which may selected from the group including a housing-member, optics-lens, art work slide, designer lens, shaped lens, plastic parts, transparent material pieces, translucent material pieces, openings, and/or cut-outs with precision optics calculation and optics design to provide an image, message, logo, characters, or sign that is visible on desired surface areas of the optics-means.

The current invention also may use a "sealed-unit" such as the one disclosed in copending application Ser. No. 11/527,631, which encloses all electric components including a prong (1b), circuit, trigger means, LED or LED connector to supply AC power source to turn on and turn off the LEDs. Alternatively, the "sealed-unit" may be replaced by a battery-pack (1o) which has all electric components within, including batteries (1p), a circuit (1q), trigger means, and/or LED 1r) or LED connectors within a case (1s) to cause illumination of the night light illumination according to a pre-determined function, timing, duration, and/or effects. This interchangeable battery-pack and sealed-unit of the d night light changing of the "power source" from AC to DC and DC to AC.

The current invention also may include a geometric design for the whole night light, which is not limited to the preferred embodiments. There are many possible alternative constructions for the night light, for example constructions in which the night light or light source may tilt, swivel, rotate, change position, have an adjustable orientation, and/or include a plurality of LEDs with different distances to the optics-means features. It will be appreciated that all of these alternative methods, arrangements, or added features will still fall within the current invention scope.

Figure 1:
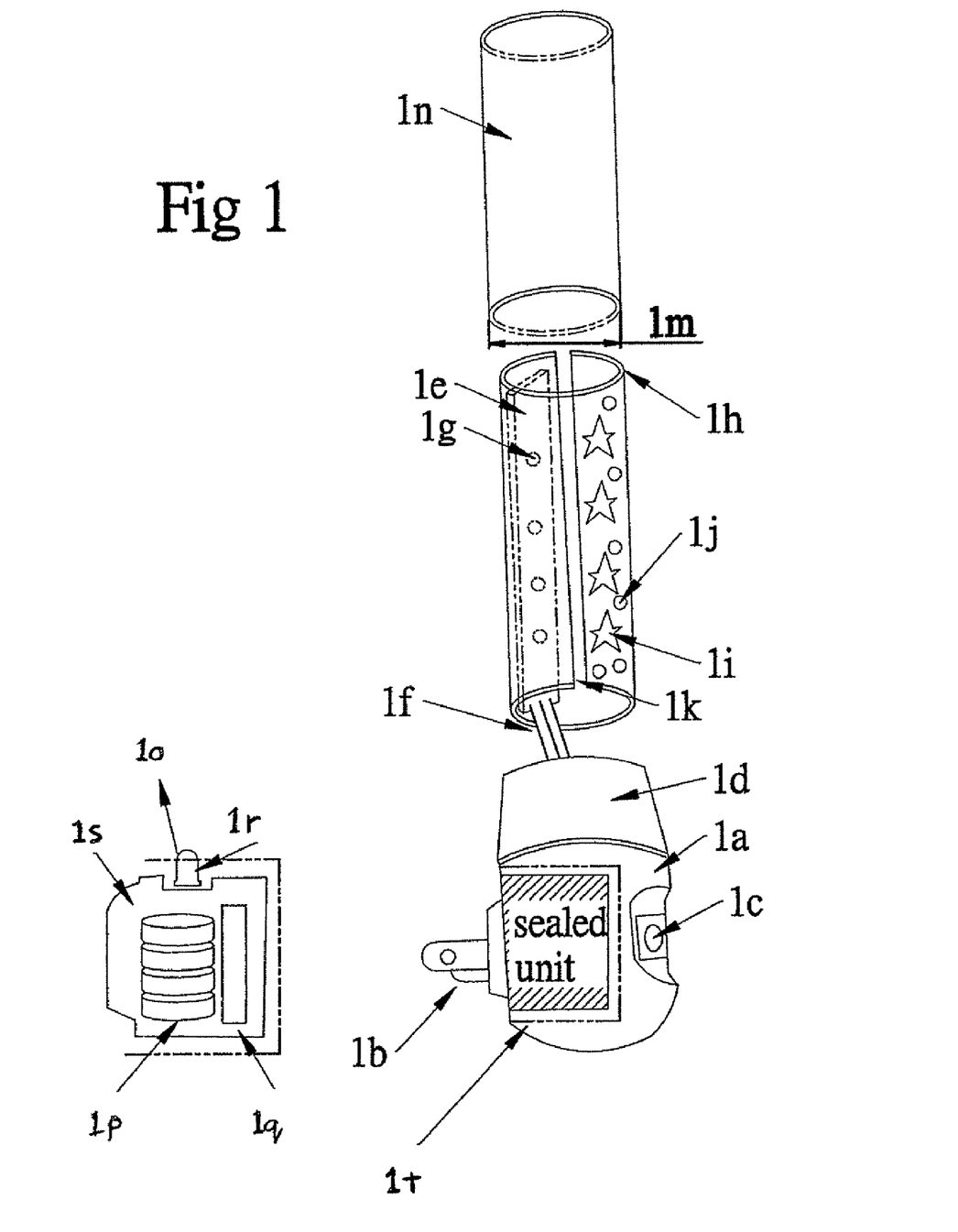
FIGS. 1, 5, and 5-1 show a first preferred embodiment of an LED night light with image projection on the optics means surface. This preferred night light is a plug-in type or plug-wire type to connect with an wall electric outlet. The night light of FIGS. 1 and 5-1 incorporate an optics film or/and optics lens with a transparent or translucent housing as the optics means to create desired image on the optics means surface. The night light of this embodiment also has a "sealed-unit" for the electric components including a prong, circuit, trigger means, and LED or LED connector within the sealed unit to pass all strict safety standards and achieve certification. The "sealed unit" can be replaced by a "battery pack" to change from an AC power operated night light to a battery operated DC power operated night light.

As shown in FIG. 1, a preferred LED night light has laser or hologram optics-means to create an eye-catching light image and at least one LED (1g) as a light source to supply visible light beams. At least one of the optics-means (1h) is incorporated with the LED (1g) and additional parts including a housing-member (1a,1b,1c,1d), optics-lens (1n), plastic film, art design slide, openings, cut-outs, a transparent material piece (1n), a translucent material piece, and/or grating means (1h) to create a desired image (1j) (1i), message, data, logo, time on optics means surface (1h). At least one power source (1b), circuit means (not shown), and trigger means (1c) are arranged to work with the LED or LEDs (1g) to obtain a desired light function, timing, colors, brightness, and/or illumination for use at night or in a dark environment over a long time period.

The night light of this embodiment also has the following features:

The LED night light device creates splendid images (1i) (1j) on the optics-means (1h) surface when the LED is incorporated with a laser processed technical film or with an injection piece, such as laser processed film (1h) positioned in front of the LED or LEDs (1g) to.

Figure 8:
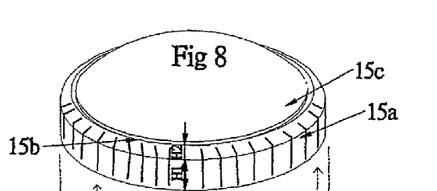
FIGS. 8 to 13 illustrate an alternative arrangement for upper and/or side illumination by a plurality of LEDs and optics means.

The LED night light may be a plug-in wall outlet night light (FIGS. 1, 5, and 5-1) or direct current operated LED night light (FIGS. 2, 3, FIGS. 7-1 to 7-10, and FIGS. 8-13) which has an image shown on the film (1h) or injection piece surface (FIGS. 7-8).

Figure 51:
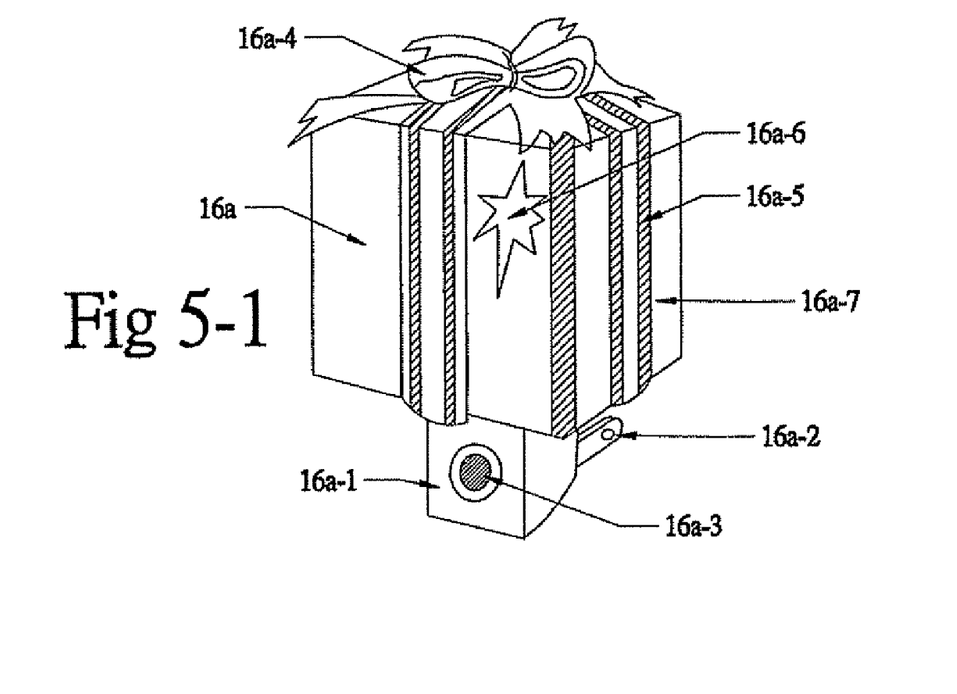

As shown in FIG. 1, a preferred plug-in night light has a base (1a) with prong (1b) to connect with a power source having a sensor or switch (1c) to turn on and turn off LEDs (1g) when the environment becomes dark, either automatically or by manual operation. The desired number of LEDs (1g) are connected by a conductive means that may include wires and/or a printed circuit board (1e) to cause the LEDs to emit the light beam to the surrounding laser or hologram-optics-means (1h) in the form of a laser processed film or laser injection piece (1h) which will cause the incoming LED light beam to form a desired light image such as a star, dots, circle, dot matrix, flower or any other configuration available from the marketplace or created from a laser lab. The preferred image in this embodiment is a star (1i) or dots (1j) or any combination thereof. The conductive means (1e) can include isolated copper wires and/or a flexible printed circuit board (FPC) to install the LEDs at a desired position. The tube or optics lens (1n) can include a transparent material piece with a different shape such as a cone (FIG. 5), tube, cube (FIGS. 5-1) or any shape with preferred optics-properties to enable the inner LEDs to create a laser image (1i) (1j) with eye-catching effects.

The current invention may also use the "sealed-unit" described in various copending applications, which has all electric components including a prong, circuit, trigger means, and/or LED or LED connector sealed within to supply power from an AC power source and turn on and off the LEDs. The "sealed-unit" also can be replaced by a battery-pack (1o) as described above, or other circuitry for causing the night light to illuminated according to pre-determined functions, timing, duration, and/or effects.

The LED light with base (1a) has an empty inner space to fit the above discussed circuit-means, sensor-means, switch-means, timer-means, IC-means, prong-means etc.

Suitable "sealed-units" are described in the above-cited copending or issued patent application Ser. Nos. (1) 11/527,631 ("LED Night light with interchangeable display unit"); (2) 11/498,881 ("Poly Night light"); (3) 11/255,981 ("Multiple light source Night Light"); And (4) 11/094,215 ("LED Night light with Liquid optics medium").

The "sealed-unit" has its own power, LED, circuit-means, and attachment means so that it can fit into any LED light housing as long as a suitable uniform compartment (1t is provided therein. The "AC powered sealed unit" may utilize a 110 Volt, 60 Hz or other high voltage connection arranged so that the sealed unit will meet all safety standards to ensure that there will be no hazard, electric short, or potential damage during multiple laboratory tests and procedures to achieve safety certification.

The uniform compartment (10 in the LED light housing has a construction and dimensions that enable the "sealed-unit" to be easily designed to fit into the compartment. The current invention also provide a "DC battery-pack" (1o) which has its own outside dimensions similar to those of the "sealed unit" so as to fit into the "uniform compartment" too. The "DC powered battery-pack" can replace the "AC powered sealed-unit" at any time because both have their own power, LED, circuit-means, and attachment means to fit the same LED light housing as long as there is a uniform compartment.

Preferably, the LED light of this embodiment can change its power source from AC to DC or DC to AC. This is a further improvement with respect to the "AC power sealed-unit" described in the above-list copending applications, not only to save a lot of tooling for different shape LED lights but also because it eliminates the need for safety testing of each different design, and therefore saves on expensive laboratory time. Furthermore, the interchangeable power source also can save a lot of tooling cost, time, and labor to provide a good LED light having a pinhole-imaging function (or LED lighting fixture, laser LED light device, etc. corresponding to devices described in various copending application) with a same nice shape but with different power sources to meet the requirements of different locations where people stay. This is one of the big features of current invention. Not only can all different shapes of LED night light, be powered by both a DC battery and AC, but so can the traditional puck light as long as people pay for extra parts to hang the traditional puck light to an AC outlet.

Figure 5:
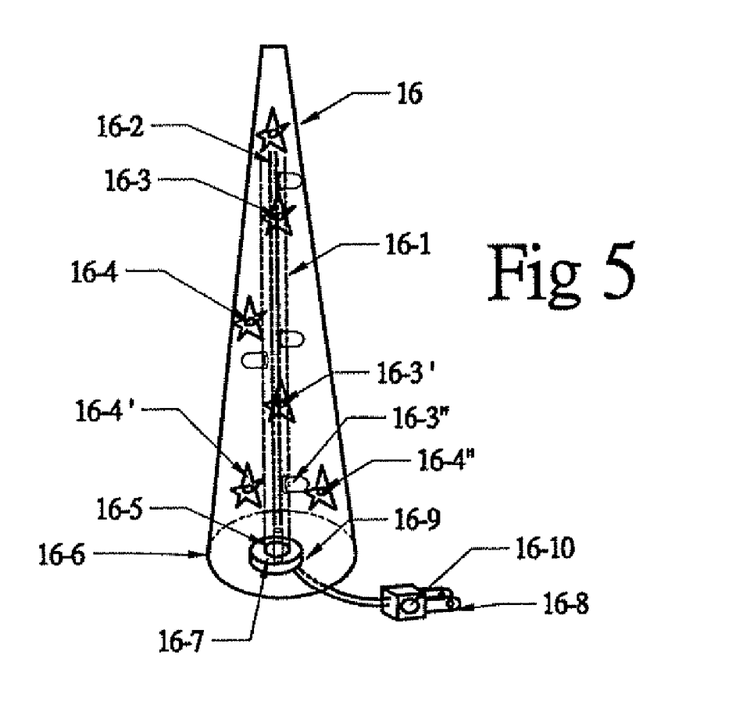

The night light of this embodiment may use a simple plastic piece with laser or hologram optics-means applied on the skin of a cone as illustrated in FIG. 5:

As shown in FIG. 5, the inner LED (16-3) or LEDs (16-2') (16-3") can include a variety of alternative types such as an LED (16-3) which has an LED chip fixed on the two isolated copper wires (16-2) and sealed by epoxy. The LED type can also be an LED chip (16-3) or LED dice (16-3'). In the example of FIG. 5, the laser or hologram optics-means are applied on a plastic sheet and several pre-cut plastic sheets are joined by hot-sealing to form a balloon (16-6) that is filled with air to become a cone shape. The interior has one channel (16-5) that allows an LED light bar (16-5') to placed therein to establish the LEDs location from top to bottom. The LED light bar (16-5') is powered by a prong (16-8) and wire to enable the cone shape laser or hologram optics-means balloon to be positioned away from the wall outlet to offer a very special night light for night time or dark environment illumination. The light bar (16-5') also can be powered by a direct current (DC) box which has batteries inside as well as trigger means, switch means, and sensor means to turn on and off the night light.

FIGS. 5-1 shows a simpler construction. The plug-in Night light has Laser or hologram optics-means (16a) which has a power source input from the prong (16a-2) and passes through the inner circuit (not shown) and conductive means (not shown) to the inner LED or LEDs to create an image (16a-6) that can be seen from any side of the optics-means surface.

Figure 6:
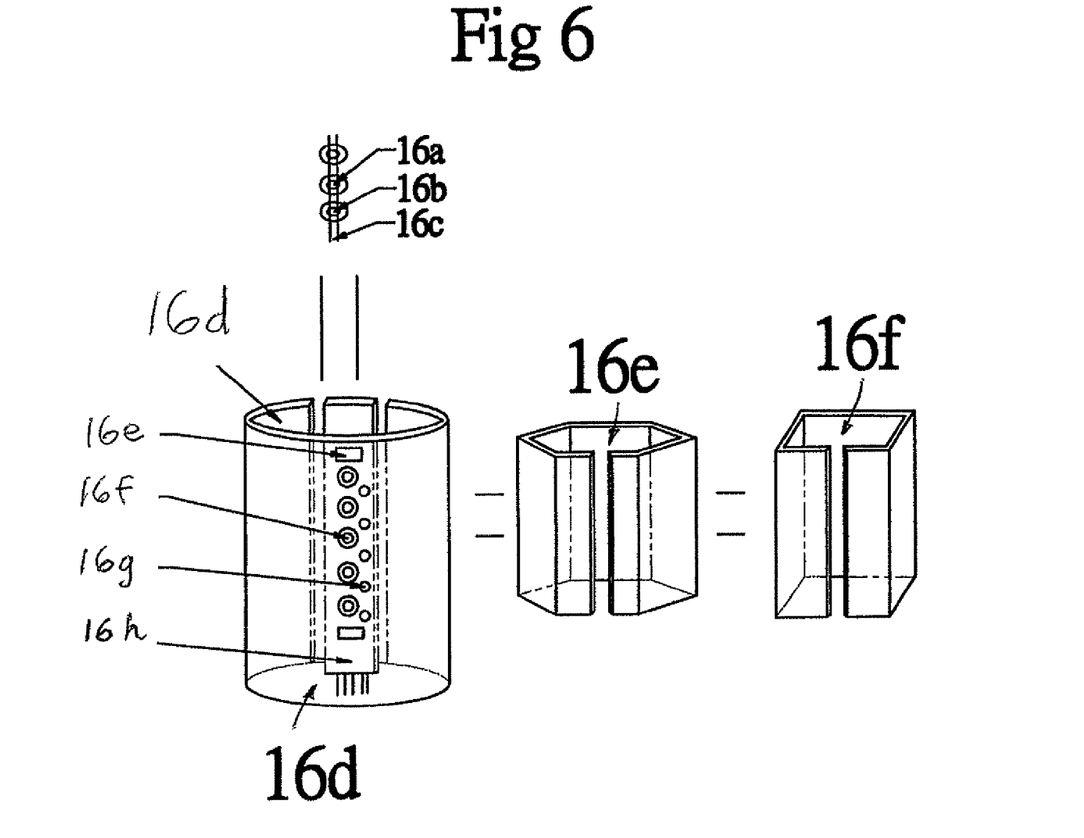

As shown in FIG. 6, the LEDs can be arranged inside the cylinder shaped laser optics-means (16d) (whether a film or injected piece) with a desired arrangement of different LED types (SMT LED 16g, Standard LED 16h, Dice LED 16i) on a PCB (16j), or inside a hexagonal laser optics-means (16e), or rectangular laser optics-means (16f).

Figure 2:
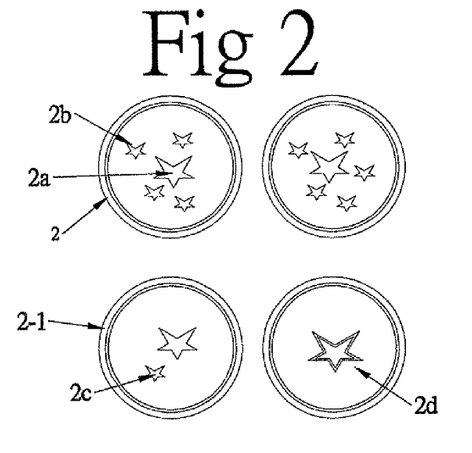
Figure 3:
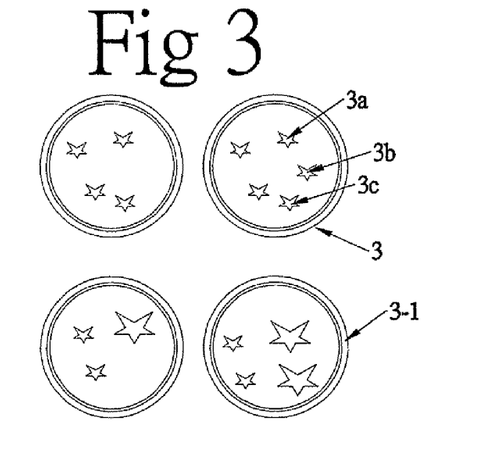

FIGS. 2 and 3 a variety of laser images on a DC powered night light, also known as a puck light or tap light. As shown in FIGS. 2 and 3, a star's laser image may be seen from the DC night light top cover. The big star (2a) is much bigger than the small star (2b) because the inner LED for the bigger star is much farther away from the optics-means, so a bigger image will be created. The image of the small star's (2b) is created by putting the inner LED a shorter distance from the optics-means. According to the same principle, the super big star (2d) has the longest distance to the optics-means and so causes a super big image to be seen. These different distance of the said LED inside the puck or tap light will cause images having different sizes, dimensions, and/or specifications to be created for a lot of good applications such as a large size puck light (2) having several LEDs inside with different distances to the optics-means so as to create a big star (2a) in the center and several surrounded small stars, so the night light will appear very well designed with nice art work. It also can save a lot of cost by putting the LED far away from the optics-means so as to get a super big star image such as (2d) that fits into a smaller size night light. There might be only one LED inside, but the light will look very valuable because of the super big star inside. FIGS. 2 and 3 teach how to apply the different distances between the said LEDs and optics-means to create some valuable and splendid yet economical DC powered night lights to improve the conventional puck or tap light.

Figure 4:
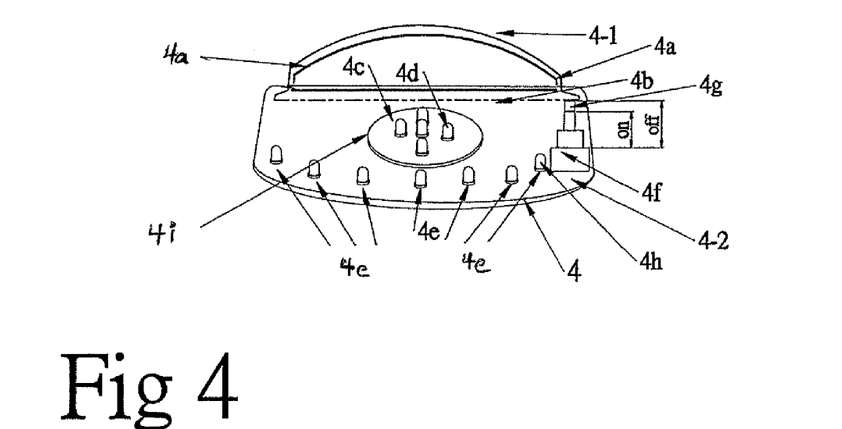

FIG. 4 is a side view of another preferred DC powered night light having a laser or hologram optic-means. The night light (4) has a cover (4-1) which may a transparent plastic cover or the same type of cover described in the inventor's U.S. Pat. No. 5,667,736 which is a laser or hologram optics-means made by an injection process. When using a transparent plastic for cover (4-1), the inner laser or hologram optics-means can be in a plastic sheet form and positioned in a preferred position (4-a) just underneath the cover (4-1) or can put at the location (4b). The only difference is the distance from the light source to the optics means. As discussed above with respect to FIGS. 2 and 3, a bigger distance between LEDs and optics-means results in a much bigger image. The inner LEDs (4d) are positioned on a PCB base 4i which is very close to the optics means (4a)(4b) so the resulting laser image will be very small in comparison with that of the LEDs (4e) on the night light base. The cover (4-1) has an extended-part which can extend through the switch (4f) tip to push the switch (4f) from a long position (off) to a short position (on). After the switch is pushed to the short position, the cover will return to the original position because the cover edge also has multiple springs to offer elastic function to push the cover back to the position illustrated in FIGS. 7-2 by spring (72p), in FIG. 12 by springs (19g) (19g') (19g"), or in FIG. 13 by springs (20g) (20g') (20g"). These springs will cause the cover to remain in a top position. The cover is one of the housing-members which prevent the consumer from seeing the ugly rectangular switch inside. This arrangement of the housing-member and inner circuit means to allow people to turn on and turn off the LEDs by simply pushing or touching the housing member is yet another advantageous feature of the Preferred LED night light having laser or hologram optics-means. An alternative to turn on and turn off the LEDs can be to make the cover and base of the night light conductive so that, when people touch the housing-member, LEDs can turn on and off. Some models can even can provide a dimmer function without departing the scope of the current invention.

Figures 71, 72:
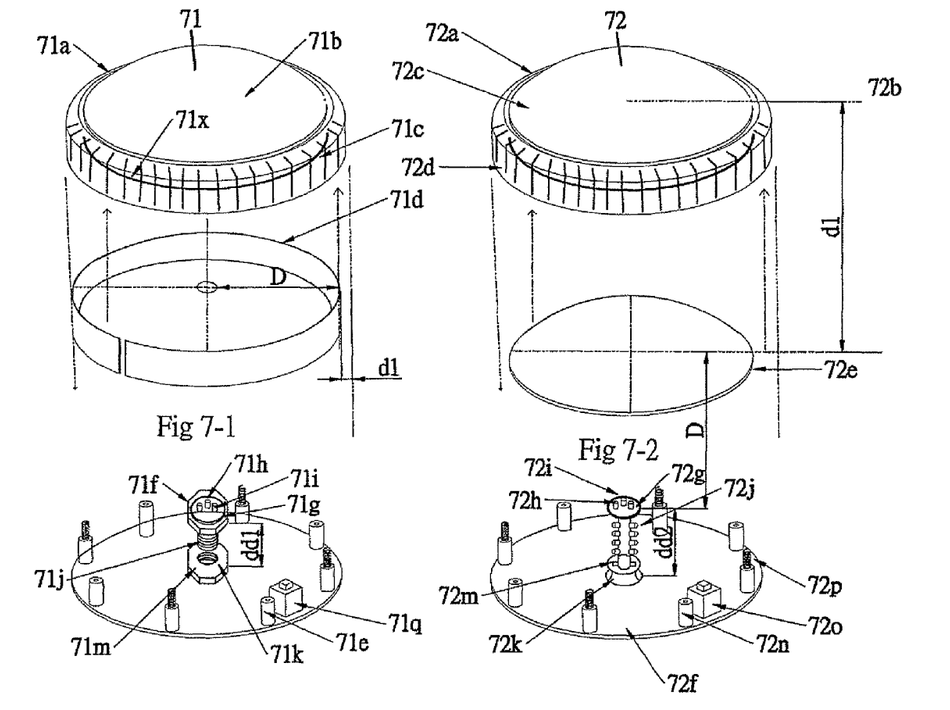

FIGS. 7-1 shows a direct current operated LED night light (71) with laser or hologram optics-means, in which the distance between the LEDs and the optics means is adjustable. At least one LED (71i) serves as a light source to supply visible light beams. At least one of the optics-means (71c)

(71d) is combined with the LED (71i) or LEDs (71h) and related parts selected from an optics-lens (71b), art work film (not shown), openings, cut-outs, transparent material piece, and translucent material piece to create a desired image (not shown), message, data, or logo on the optics means surface (71d). At least one of a power source (not shown), circuit means (71h), and trigger means (71q) is arranged to work with the LE D (71i) or LEDs (71h) to get a desired light function, timing, colors, brightness, illumination, and/or light effects. Preferably the LED night light device (71) of this embodiment is a direct current (DC) power source night light which can be turned on when the housing-member (71b) been touched or pushed. The DC power source supplies direct current to the LED or LEDs and may be in the form of an AC adaptor with a jack, solar power source, wind power source, chemical power source, generator power source, or any DC power source available from the market.

FIGS. 7-1 shows a laser processed film or injected piece (71d) in the form of a circle shape (1d) arranged to fit into the top housing (71a) at the position (71x). The laser processed film or injected piece (71d) is situated a distance D from the light source (71p). The distance D is very important when making the laser processed film or injected piece so as to enable a desired image on the laser processed film or injected piece to be seen. As explained above in connection with FIGS. 2-4, the distance D can determine the number of images, size of the images, and configuration of the images.

As shown in FIGS. 7-1, the LED (71i) is installed on a printed circuit board (71h) on the base (71O. The base (71O has a height that can be adjusted over a distance (dd1). The adjust-means of this preferred embodiment includes a screw-nut (71m) with center hole (71k) to receive screw-bolt (71j) and allow adjustment of the height of the LED with respect to the base (71f). The LED (71i) and others LEDs can emit light to the laser processed film (71d). This embodiment can provide a very pretty color image on the walls (71c).

As shown in FIGS. 7-2, the laser processed film or injected piece (72c) are positioned in a horizontal position (72d) on top housing (72b) so that the image will be seen on the top area of the DC powered night light (72). The adjustable means of this preferred embodiment uses the detents (72j) and receiving hole (72k) to hold position at a certain height. The height of the LED or LEDs (72i) on the base (72h) can therefore be adjusted to change the distance (D) between the laser processed film (72c) and light source (72h) to cause the image to be changed. The adjustable means can have a range (dd2) over which the height of the LED or LEDs can be adjusted.

Figure 73:
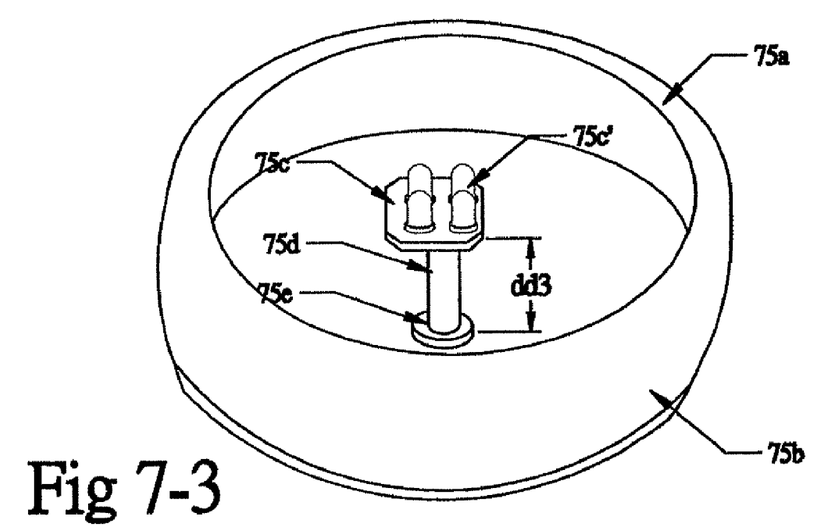

FIGS. 7-3 shows a wall (75a) located on the lower housing (75b). The adjustable means (75d) (75e) has a height-adjustable range (dd3) over which the height of the LEDs relative to the PCB (75c) can be changed.

Figure 74:
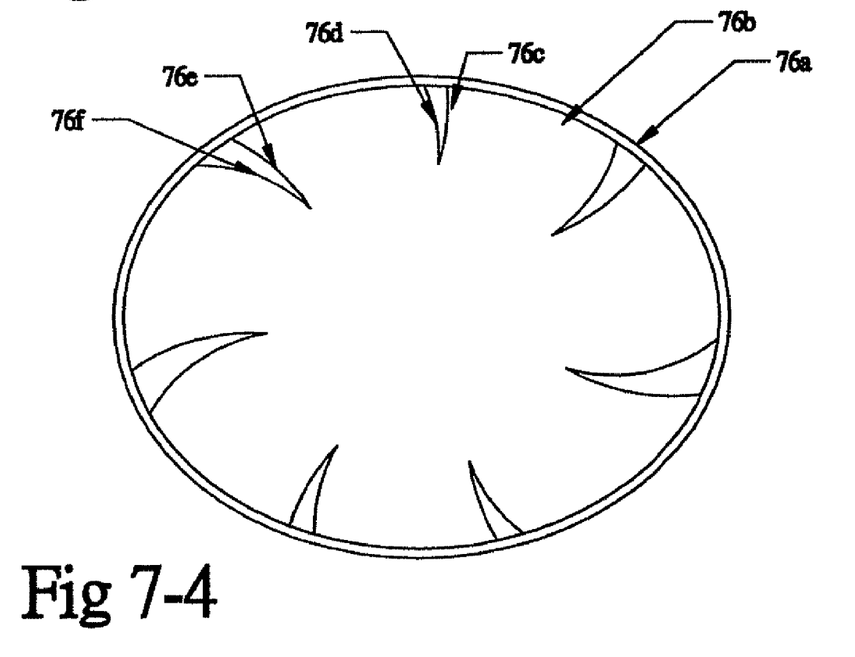
Figure 75:
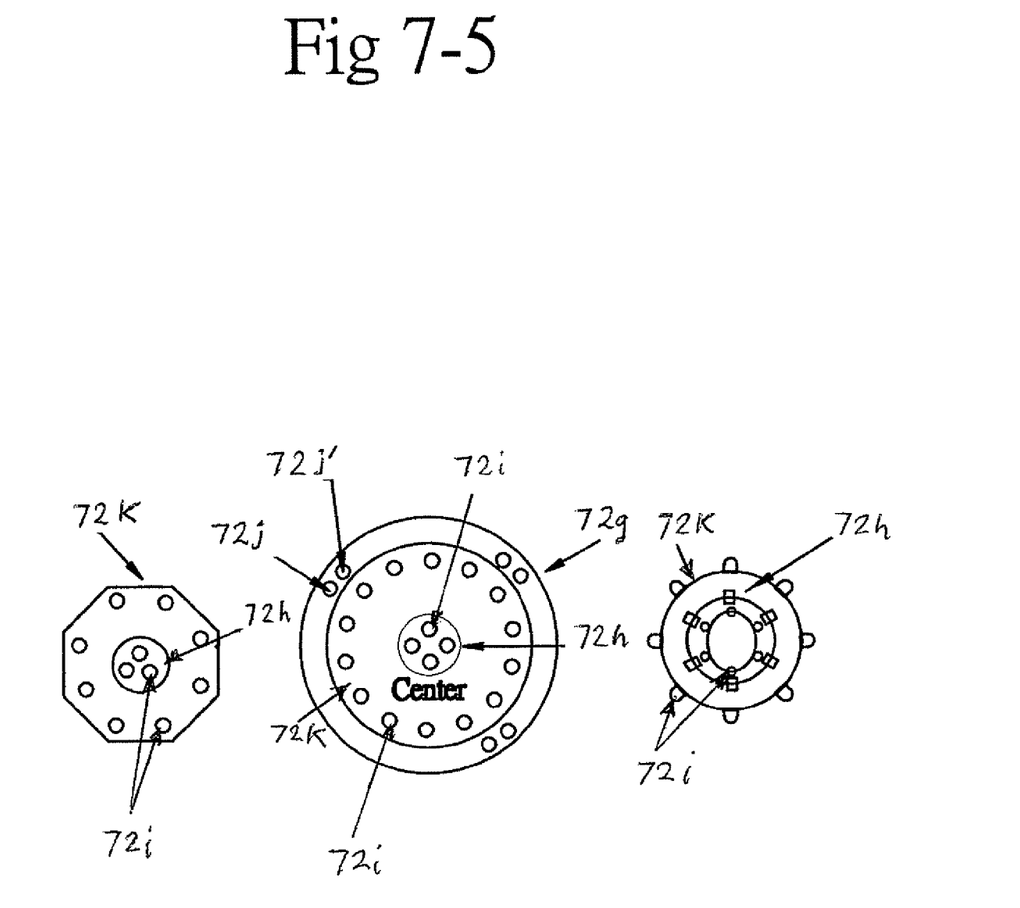

FIGS. 7-4 shows one preferred arrangement for enabling the laser processed film (76b) to fit into the dome shape top housing (76a). The flat film cannot fit into the ball shape dome, so multiple cuts (76b) (76c) (76d) (76e) (76l) need to be made in the film. This is an economical arrangement to make a low-end product. An up-graded model with an injected piece may utilize the grating or hologram techniques disclosed in the inventor's U.S. Pat. No. 5,667,736.

FIGS. 7-5 and 7-11 show the LED's or LEDs' position on a lower housing of the preferred embodiment of FIGS. 7-1 to 7-4. The PCB (72h) can be any size as long as it is smaller than the base (72k) and/or a lower housing (72g), either of which may include terminals (72j) and/or spring terminals (72j') for connection to a power source. The LED or LEDs (72i) can be arranged on the center area or edge of the PCB (72h) to face upward or outward as required to determine the distance (D) between the laser processed film or injected piece and light source so as to enable different sizes of the image to be seen by a viewer. Some applications need LEDs on an edge of the bases (72k), which will have too much cost for a PCB so may be preferred to use wires to make electric connection for each LED to follow the contour of a big round disc edge.

Figure 76:
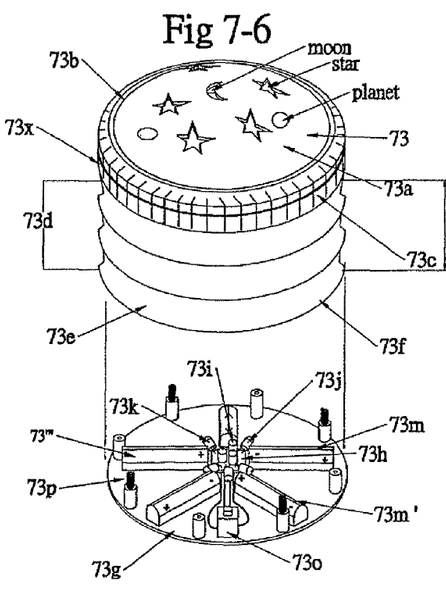

As shown in FIGS. 7-6, The direct current operated LED night light of this embodiment also has a laser or hologram optics-means. At least one LED (73i) serves as a light source to supply visible light beams. At least one of the optics-means (73a) is incorporated with the LED and/or parts selected from one or more of an optics-lens, art design film, openings (star) (planet), cut-outs (moon), a transparent material piece, paint, silkscreen, and/or translucent material piece (73a) to create the desired image or message on the optics meanss surface. At least one of the power source (73m) (73m') (73m'') (73m'''), circuit means (73h), and trigger means (73o) are arranged to work with the LED or LEDs (73i) to provide a desired light function, timing, colors, brightness, illumination, and/or light effects. The LED night light device (73) having a laser or hologram optics-mean is a direct current power source night light which can be turned on when the housing-member (73a) has been touched or pushed. The direct current power source (73m) (73m') (73m'') (73m''') that supplies power to the LED or LEDs may be an AC adaptor with jack, solar power source, wind power source, chemical power source, generator power source, or any direct current power source available from the market.

As shown in FIGS. 7-6, the DC operated LED night light with optics-means (73) has a top housing (73a) having a plurality of art designs (stars) (moon) (planet) or paintings on the transparent material piece (73a) to allow the LED light to have a good appearance even when no LED light is turned on and spread out to the desired surface. The top housing (73a) has a foldable skirt (73d) which can used to adjust the height of the top housing to move an optics-lens (73a) to a higher or lower location to change the distance (D) between the optics-lens (73a) and light source (73i). Another adjustable means on the LED's or LEDs' base (73h) can be used to adjust the height of the LED(s) adjustable from the LED base. The adjustable skirt (73d) or adjustable means of the LED base are by way of example only. It will be appreciated that any construction having a similar or equal function may still fall within the current invention scope in order to adjust the distance between the optics-means and light source to provide a clear image on the desired surface to fit all kinds of rooms or spaces.

Figure 77:
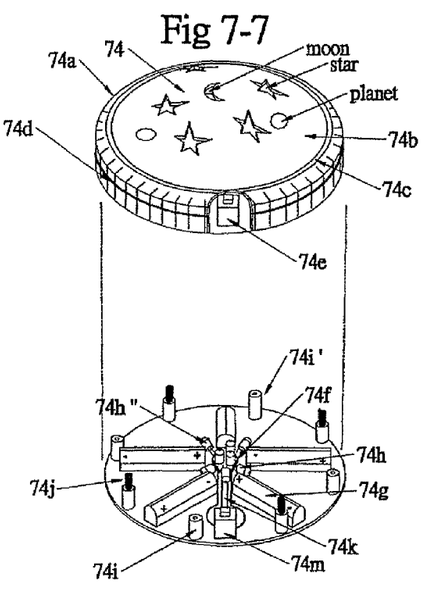

As shown in FIGS. 7-7, another preferred DC operated night light has a top optics-lens (74b) with a plurality of art designs (stars) (moon) (planet) or paintings on a transparent material piece (73a) to allow the LED light to have a good appearance when no LED light is turned on and spread out to the desired surface. The trigger means (74c) always keep the same position against the top optics-lens (74b) and will be triggered when the top optics-lens been touched or pushed to turn the LED on and turn off. In order to get a clear image on the desired surface, an adjustable means (not shown) is designed on the LEDs' base to enable the LEDs (74f) to move up or down to make the image clear for different rooms or space.

FIGS. 7-6 and 7-7 show a preferred arrangement of batteries (73m) (73m') (73m'') (73m''') in a spiral space that enables a plurality of LEDs (73K) (73j) (74h) (74h') (74h'') to be installed as close as possible to the center to increase the distance between the light source and the optics means when using an optics-means such as a laser processed film or injected piece on a wall location. The larger distance will create more exciting image effects.

As shown in FIGS. 7-6, LEDs (73*j*) (73*k*) are very close to the center position so that their light beams will spread out to the wall areas to hit the optics-means, including a laser processed film or injected piece, to thereby provide excellent image effects on the desired surface. If the LEDs are too close to the wall area, then the effects will be limited and the laser tooling work will become very difficult. Normally the 2-10 cm+/−50% distance between laser process film or injected piece and the light source is very good and a variety of laser processed films or injected pieces are available from marketplace for use therewith, so there is not need for a big investment in laser tooling as would be required for applications with too short a distance.

Figure 78:
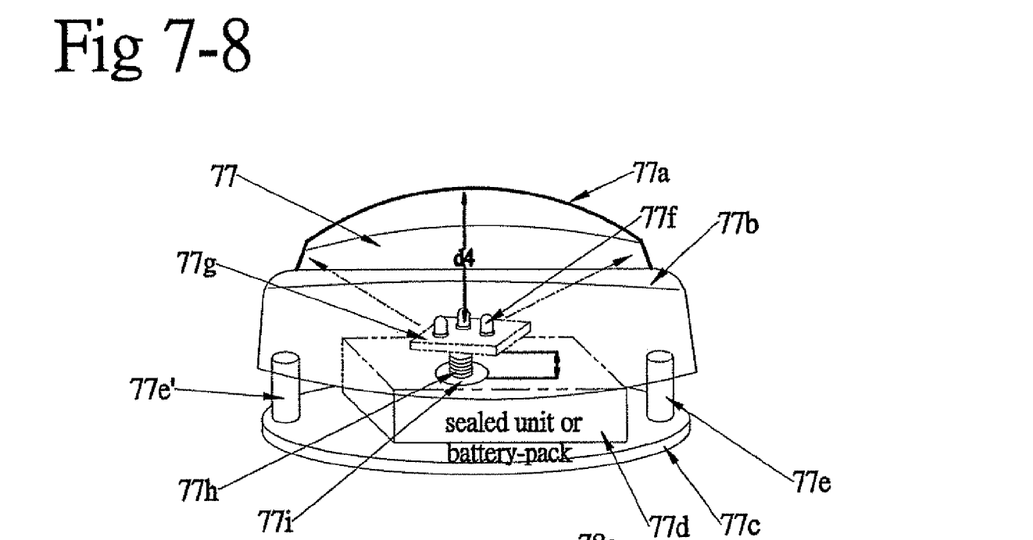
Figure 79:
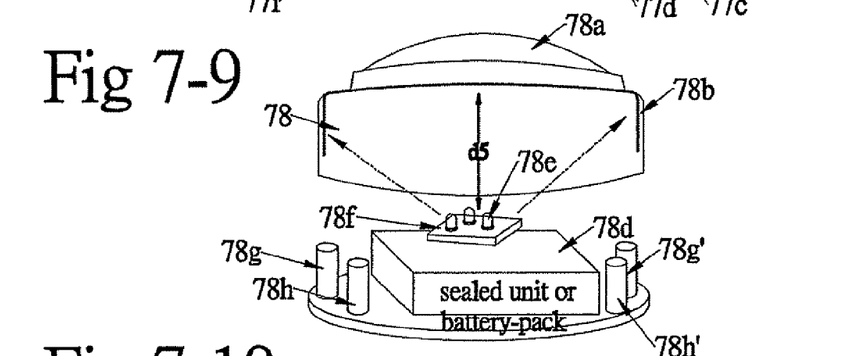
Figure 710:
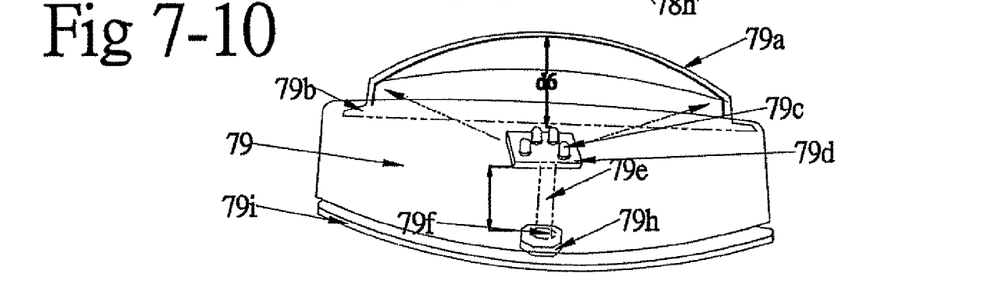
Figure 711:
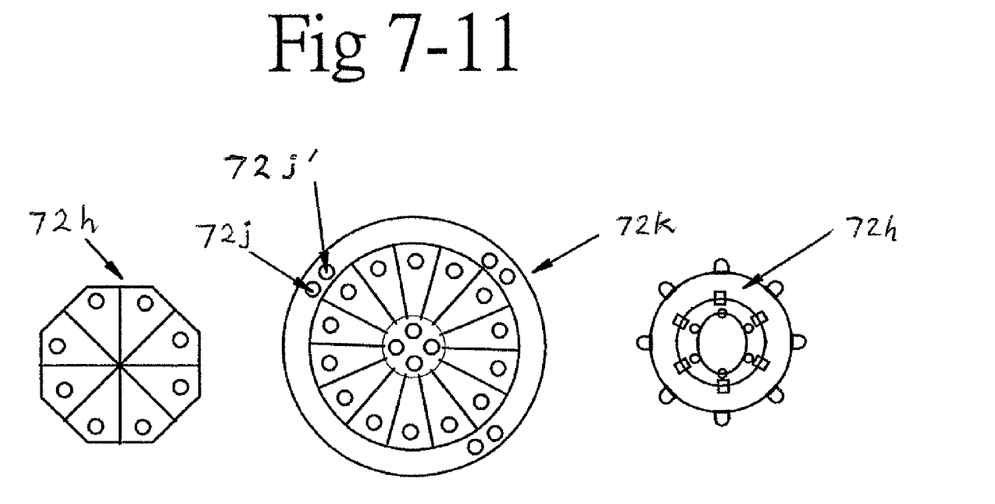

FIGS. 7-8, 7-9, 7-10 shows three preferred embodiments having different distances (d4) (d5) (d6) between the top optics-means (77*a*) 978*a*) (79*a*) and light source (77*f*) (781) (79*c*). The top optics-means may in the form of a laser processed film or injected piece. These embodiments also have adjustable means (77*h*) (79*e*) with height adjustable ranges (dd4) (dd6) so as to enable a clear and exciting image to be shown on the desired surfaces. All of the preferred embodiments use DC from batteries and/or supplied by a variety of input power sources as discussed above. As shown in FIGS. 7-8 and 7-9, the DC powered battery-pack can be replaced by an AC powered sealed-unit at any time because the LED light has been pre-designed to fit in a uniform compartment, as will be understood from the drawings.

Figure 10:
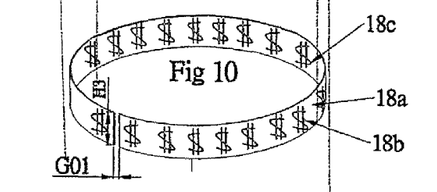
Figure 12:
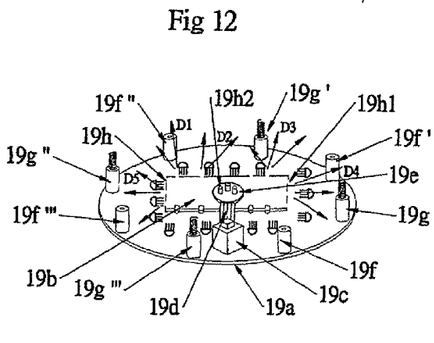

FIGS. 8, 10, and 12 shows a preferred DC operated night light for displaying images (18*b*) (18*c*) on a desired surface through the wall (15*b*) with a dollar sign formed by a laser processed film or injected piece. The lower housing (19*a*) has a battery compartment (19*b*) and switch (19*c*) with assembly poles (19*f*) (10*f*) (19*f'*) (19*f"*) and spring members (19*g*) (19*g'*) (19") (19''') to bias the top optics-lens (15*c*) to a top position and enable the top optics-lens to be pushed to turn on and off an LED. The LED or LEDs (19*h*2) are positioned on a PCB (19*e*) and connected with a power source by conductive wires (19*d*) to supply the electric signals that turn on and off the LED or LEDs according to a pre-determined function, brightness, color, effects, and/or performance. A plurality of LEDs also can be installed along the battery compartment edge, but this is not the best arrangement. The best arrangement should be similar to that shown in FIGS. 7-5, 7-6, 7-7 to provide more distance between the light source and optics-means as discussed above. The plurality of LEDs along the battery compartment could then create an exciting image on a desired surface.

Figure 9:
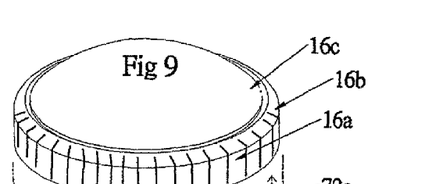
Figure 11:
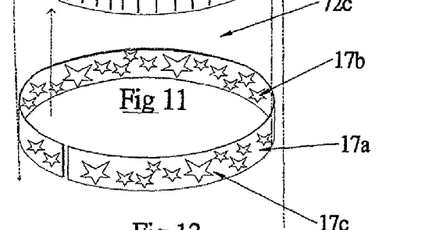
Figure 13:
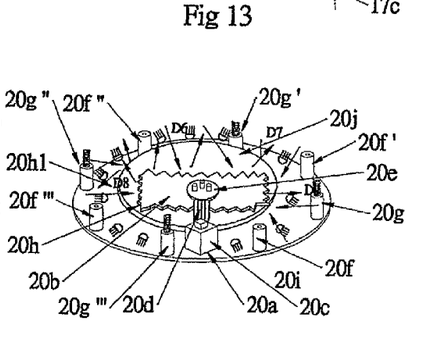

FIGS. 9, 11, 13 show a similar treatment to that of FIGS. 8, 10, and 12. The major difference is that all of the plurality of LEDs emit light inwardly to the circle reflector (20*j*) to direct a lot of light spots at the reflector (20*j*), which then hit the optics-means (17*a*) surrounding the wall of the night light. The addition of extra reflectors on the night light is helpful to increase the number of light spots.

The current invention may incorporate concepts, drawings, and designs disclosed in copending or patented applications by the same inventor. It will be appreciated that arrangements including all of these concepts, ideas, and knowledge may still fall within the scope of the invention, including equivalent or functionally replaceable and alternative arrangements.

While the above-discussed and mentioned preferred embodiments show the scope of the current invention, it is to be appreciated that any design having alternative or equivalent functions, construction, modification, or up-grade may still fall within the scope of the invention, which is not limited to all above discussion and details described therein. Among the elements that may be varied are the power source, conductive means, geometric shape of the LED-units, -connection means, circuit means, sensor means, switch means, LED elements, attachment means, fixing-means, tightening means, and resilient conductive means, all of which may have alternative arrangements, design, and construction.

The invention claimed is:

1. A light emitting diode (LED) night light having a laser or hologram optics-means, comprising:
    at least one LED that serves as a light source for visible light beams;
    at least one laser or hologram optics-means for displaying on a surface of the optics-means an image, message, or logo created by light passing through the optics-means, said laser or hologram optics-means including parts selected from the group consisting of a housing member, optics lens, plastic piece, openings, cut-outs, transparent material piece, translucent material piece, sealed unit, and battery pack; and
    at least one of a power source, circuit means, and trigger means arranged to work with said at least one LED to provide at lease one of a desired light function, timing, colors, brightness, and illumination and to meet safety standards for use by people over a period of time;
    the improvement wherein:
    at least one of a position, orientation, and light beam emitting direction of said LED is arranged to be changed relative to the laser or hologram optics-means to change a size, brightness, dimension or specification of said image, message, or logo created by light passing through the optics-means and displayed on the surface of the optics-means, and
    said night light is a night light having a prong means for plugging the night light into a wall outlet to provide electric power to the night light for said period of time to provide illumination in a dark environment.

2. The LED night light having a laser or hologram optics-means as claimed in claim 1, wherein said prong means is directly plugged into said wall outlet without wires between the night light and prong means.

3. The LED night light having a laser or hologram optics-means as claimed in claim 1, wherein night light is separated from said wall outlet by a wire connecting said night light and said prong means.

4. The LED night light having a laser or hologram optics-means as claimed in claim 1, wherein said sealed-unit is arranged to supply said electric power from said prong means to said at least one LED without risk of electric shock, and wherein said sealed-unit is interchangeable with a battery pack arranged to fit into a same space in said night light to supply electric power from batteries in said battery pack to said at least one LED, said interchangeability between said sealed-unit and said battery pack permitting the night light to be changed from a direct current (DC) power source to an alternating current (AC) power source or from an AC power source to a DC power source.

5. A light emitting diode (LED) night light having a laser or hologram optics-means, comprising:
    at least one LED that serves as a light source for visible light beams;
    at least one laser or hologram optics-means for displaying on a surface of the optics-means an image, message, or logo created by light passing through the optics-means, said laser or hologram optics-means including parts selected from the group consisting of a housing member, optics lens, plastic piece, openings, cut-outs, transparent material piece, translucent material piece, sealed unit, and battery pack; and at least one of a power source, circuit means, and trigger means arranged to work with said at least one LED to provide at lease one of a desired light function, timing, colors, brightness, and illumination and to meet safety standards for use by people over a period of time;

the improvement wherein:

said image, message, or logo is created by incorporating means for creating said image, message, or logo into a laser processed film or injection piece that forms said laser or hologram optics-means, said laser processed film or injection piece being situated in front of said at least one LED such that light from the LED passes through the optics-means to enable said image, message, or logo to be seen by a viewer, said power source of said night light is a direct current power source that supplies electric power to said at least one LED to cause said image, message, or logo to be displayed on a surface of said laser processed film or injection piece, and at least one of a position, orientation, and light beam emitting direction of said LED is arranged to be changed relative to the laser or hologram optics-means to change a size, brightness, dimension or specification of said image, message, or logo created by light passing through the optics-means and displayed on the surface of the optics-means.

6. A light emitting diode (LED) night light having a laser or hologram optics-means, comprising:

a housing;

at least one LED that serves as a light source for visible light beams;

at least one laser or hologram optics-means for displaying on a surface of the optics-means an image, message, or logo created by light passing through the optics means, said laser or hologram optics-means including parts selected from the group consisting of a housing member, optics lens, plastic piece, openings, cut-outs, transparent material piece, translucent material piece, sealed unit, and battery pack; and at least one of a power source, circuit means, and trigger means arranged to work with said at least one LED to provide at lease one of a desired light function, timing, colors, brightness, and illumination and to meet safety standards for use by people over a period of time;

the improvement wherein:

the LED night light is a direct current (DC) power source night light arranged to be turned on when said housing has been touched or pushed to cause said circuit means to turn on and off according to predetermined functions and duration, said power source supplies DC power from one of: an alternating current (AC) adaptor with a jack; a solar power source; a wind power source; a chemical power source; a generator power source; and any other market-available direct power source, and at least one of a position, orientation, and light beam emitting direction of said LED is arranged to be changed relative to the laser or hologram optics-means to change a size, brightness, dimension or specification of said image, message, or logo created by light passing through the optics-means and displayed on the surface of the optics-means.

7. The LED night light having a laser or hologram optics-means as claimed in claim 5 or 6, wherein said circuit means is arranged to provide light functions selected from the group consisting of fade-in and fade-out, automatic color changing, sequential or random on and off, chasing, pair flashing, time delay, time period selection, steady on, turn on or off in response to a photo or motion sensor, brightness changing, rotating effects, and other market-available light functions.

8. The LED night light having a laser or hologram optics-means as claimed in claim 5 or 6, wherein said optic-means is an injection plastic piece.

9. The LED night light having a laser or hologram optics-means as claimed in claim 5 or 6, wherein said optics-means has a geometric shape selected from the group consisting of a sphere, ball, half-ball, coil, roll, twisted pipe, and shape that has been pre-cut to fit a desired housing member.

10. The LED night light having a laser or hologram optics-means as claimed in claim 5 or 6, wherein said circuit means is selected from the group consisting of a circuit board, integrated circuit, conductive means, switch means, AC jack, solar module, AC plug and wire, AC adaptor, sensor means, motion sensor means, and timer means to provide a desired light function and effects.

* * * * *